United States Patent [19]
Basse

[11] 3,786,277
[45] Jan. 15, 1974

[54] CIRCUIT ARRANGEMENT OF MOS TRANSISTORS OPERATING ACCORDING TO THE DYNAMIC PRINCIPLE FOR DECODING THE ADDRESSES FOR AN MOS MEMORY

[75] Inventor: Paul-Werner V. Basse, Nantwein, Germany

[73] Assignee: Siemens Aktiengesellschaft, Berlin and Munich, Germany

[22] Filed: May 1, 1972

[21] Appl. No.: 249,416

[30] Foreign Application Priority Data

July 22, 1971 Germany .................. P 21 36 771.5

[52] U.S. Cl. ............................ 307/238, 340/173 R
[51] Int. Cl. ........................ G11c 11/40, H03k 5/00
[58] Field of Search ............... 307/238, 221 C, 208, 307/205; 340/173 AM, 173 R, 174 TB

[56] References Cited

UNITED STATES PATENTS 3,706,975 12/1972 Paluck ......................... 340/173 FF

OTHER PUBLICATIONS

Boysel et al., "Random-Access MOS Memory – – – ," Electronics, Feb. 16, 1970 p. 109–115

Hurley, "Transistor Logic Circuits," 1961, Wiley & Sons, p. 323–327

*Primary Examiner*—Thomas J. Sloyan
*Attorney*—Benjamin H. Sherman et al.

[57] ABSTRACT

A dynamic decoding circuit arrangement employes a delay circuit for delaying the trailing edge of clock pulses and applying the clock pulses to the individual decoding circuits so that only one of the decoding circuits is effective to emit a memory access signal in accordance with the applied address.

2 Claims, 3 Drawing Figures

CIRCUIT ARRANGEMENT OF MOS TRANSISTORS OPERATING ACCORDING TO THE DYNAMIC PRINCIPLE FOR DECODING THE ADDRESSES FOR AN MOS MEMORY

BACKGROUND OF THE INVENTION

1. Field of the Invention

This invention relates to a circuit arrangement of MOS transistors which operates according to the dynamic principle for decoding the addresses for an MOS memory, and more particular to a decoding circuit arrangement operating according to the dynamic principle and integrated onto a chip wherein only a single pin connection is required per chip for receiving clock pulses.

2. Description of the Prior Art

The general type of circuit arrangement which is of concern to the present invention is that type of decoding circuit which is constructed of MOS transistors and which operates according to the dynamic principle for decoding the addresses of an MOS memory, wherein the MOS memory and the decoding circuit are integrated onto a chip, wherein parallel-connected MOS transistors (individual decoding circuits) are provided for the selection of each line or column of the MOS memory, respectively, which parallel-connected MOS transistors have gates which are provided with address signals of one binary character or the other and controlled conduction paths which are interconnected at one end thereof to form the control lines for the storage cells of a line or column, respectively, the control lines also being connected with an operational voltage source by means of a MOS transistor which is in turn controlled by a control pulse, for example a clock pulse.

MOS memories are well known in the prior art; for example, see "Electronics," Feb. 16, 1970, Pages 109–115. The access time on an MOS memory is essentially determined by the decoding time of the address decoding circuits. If decoding circuits are utilized which are constructed according to the static principle, high decoding speeds are reached only when the decoding circuits are designed with high losses. Decoding circuits constructed according to the dynamic principle are faster and require less losses. Prior art decoding circuits constructed according to the dynamic principle, however, require at least two control pulses; for example, see "Electronics," Feb. 16, 1970, Page 111.

In the prior art circuit, the decoding circuit comprises parallel-connected MOS transistors whose gates are supplied with the address bits. The interconnected ends of the controlled conduction paths of the MOS transistors form the control lines for a line or column of the MOS memory and are connected with a first operational voltage source by way of an MOS transistor which is controlled by a first control pulse. The other interconnected ends of the controlled conduction paths of the MOS transistors are connected with another operational voltage source by way of an MOS transistor which is controlled by a second control pulse. Such a parallel connection of MOS transistors is provided for each line or column, respectively, and is hereinafter referred to as a partial decoding circuit. The second control pulse is required to cause the decoding circuit which has selected the address bits to emit a signal onto the associated control line of the MOS memory. The function of the prior art circuit is described in detail in the above "Electronics" article.

SUMMARY OF THE INVENTION

The foregoing type of decoding circuit has the drawback that several pulses are required for an operation so that the chip on which the MOS memory and the decoding circuit are integrated must comprise several connection pins for the control pulses. It is therefore the primary object of this invention to provide a decoding circuit wherein only one connection pin is required per chip for control pulses, which may be clock pulses.

The foregoing object is achieved through the provision of a delay circuit which is integrated onto the memory chip and which is supplied with a control pulse. The delay circuit functions to delay the trailing edge of the control pulse and has an output which is connected to the interconnected ends of the controlled paths of the MOS transistors of the partial decoding circuits so that the emission of a signal by a selected partial decoding circuit onto the associated control line is caused due to the delayed trailing edge of a control pulse.

Since the MOS memory and the decoding circuit are integrated onto the same chip along with the delay circuit, only one connection pin is required for a control pulse. The delay circuit may be realized very simply and is only required once for the entire decoding circuit of a storage chip. Since the delay circuit is also integrated onto the chip, it is subject to the same component tolerances as the remaining component elements of the memory. The delay time of the delay circuit has an optimum which is determined by means of the characteristics of MOS transistors which make up the delay circuit and is then always adapted to the speed of the remaining parts of the decoding circuit. A very good temperature change synchronization between the delay circuit and the remaining parts of the decoding circuit is simultaneously obtained.

BRIEF DESCRIPTION OF THE DRAWINGS

Other objects, features and advantages of the invention, its organization, construction and operation will be best understood from the following detailed description of a preferred embodiment thereof taken in conjunction with the accompanying drawings, on which.

DESCRIPTION OF THE PREFERRED EMBODIMENT

Figure 1:
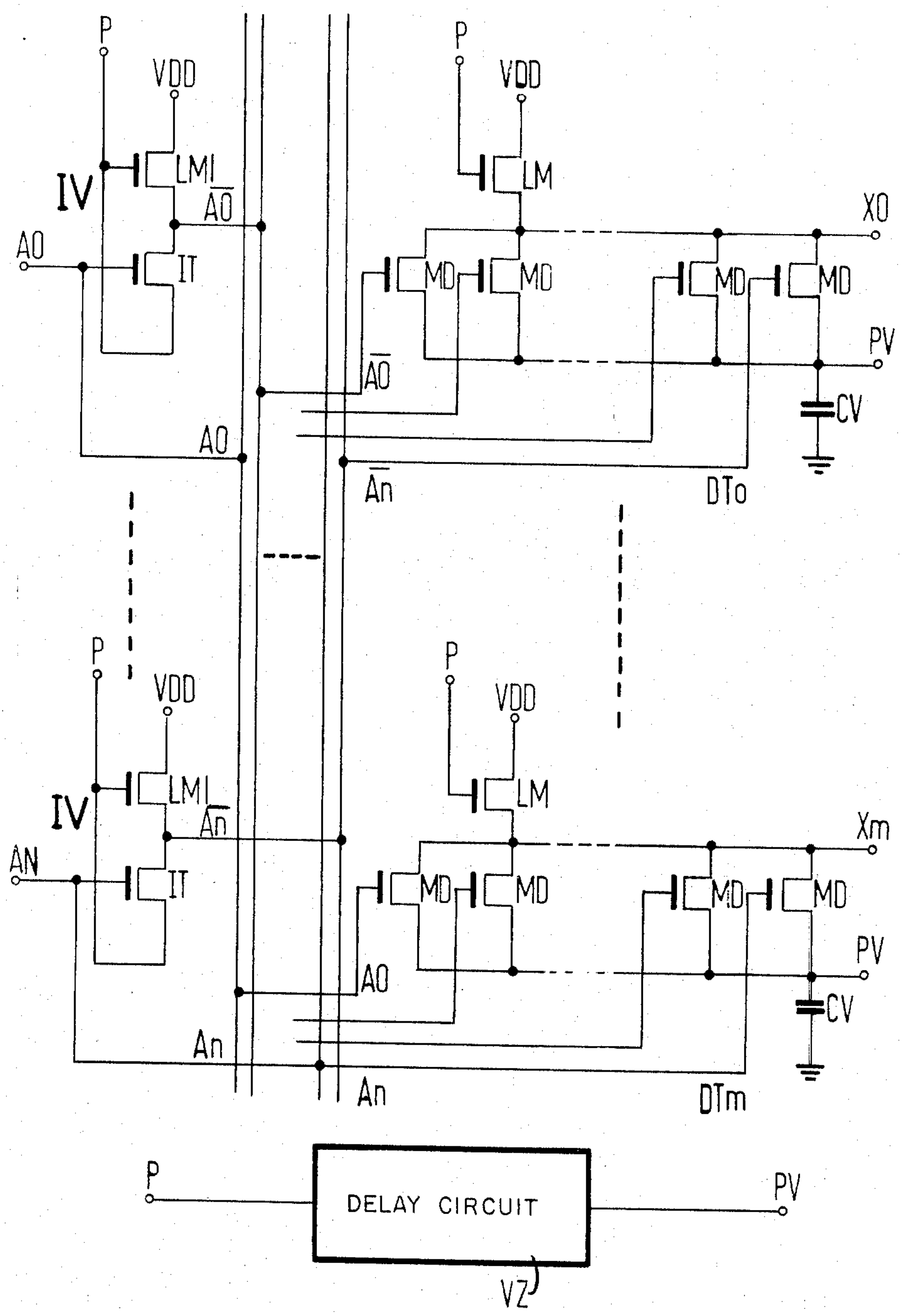
FIG. 1 is a schematic circuit diagram of a decoding circuit constructed in accordance with the principles of the present invention.

Referring to FIG. 1, a decoding circuit comprises a plurality of partial decoding circuits DTo through DTm and a delay circuit VZ. A partial decoding circuit DT comprises parallel-connected MOS transistors MD each having controlled conduction paths which are interconnected at one end with an operational voltage source VDD by way of a charging MOS transistor LM. These interconnected ends of the controlled conduction circuits simultaneously form the control line X*O*–X*m* for the respective associated line of the storage cells of the MOS memory, the memory itself not being illustrated in the drawing. A control pulse P, which may be a clock pulse, is applied to the gate of the charging MOS transistor LM. The other ends of the controlled conduction paths of the MOS transistors MD are interconnected and connected to an output PV of the delay circuit VZ. The delay circuit VZ is also supplied with the control pulse P at its input. The address bits are extended to the gates of the MOS transistors MD of the partial decoding circuits DT in the form of one or the other binary characters. Therefore, address inverters IV are provided and respectively comprise two MOS transistors in the form of a load MOS transistor LM1 and an inverter MOS transistor IT. The address inverters IV operate according to the dynamic principle and are well known from the literature.

Figure 3:
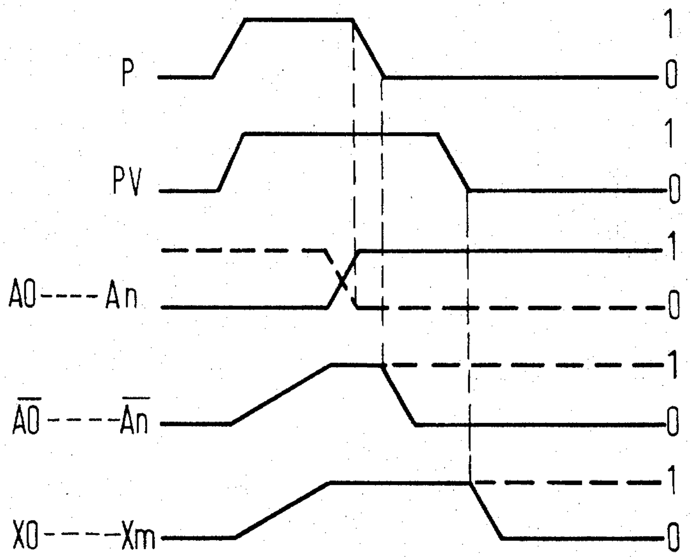
FIG. 3 is a pulse schedule for the decoding circuit of FIG. 1.

The mode of operation of the decoding circuit is as follows. The pulse schedule of FIG. 3 is taken into account for this description and is illustrated for n-channel transistors. With p-channel transistors, the signal polarity is reversed. First of all, the pulse P occurs in the first line of FIG. 3 and renders the MOS transistors LM1, LM conductive so that the outputs $\overline{AO}$ through $\overline{An}$ of the address inverters IV, the output XO through Xm of the partial decoding circuits and the output PV of the delay circuit VZ are charged by way of the charge transistors LM1, LM contained in these circuit portions. Before the control pulse P disappears, the address signals AO through An (third line of FIG. 3) are provided. After the trailing edge of the control pulses P, the address signals are inverted, particularly in such a way that the outputs of the address inverters IV are discharged only when the inverter transistors IT are rendered conductive by way of the given address signals.

After the inversion of the address signals has been completed, the delayed trailing edge of the control pulse P appears at the output PV of the delay circuit VZ, as illustrated in the second line of FIG. 3. The address signals are decoded with the help of this delayed trailing edge in such a way that all outputs of the partial decoding circuits are discharged by means of conductive MOS transistors MD, except for the one output XO through Xm, where all MOS transistors MD are blocked due to the combination of the address signals and their inversion. This output remains charged (the charge remains on the distributed line capacitance CV) and is therefore regarded as having been selected, as indicated in the fifth line of FIG. 3.

It is assumed, for example, that the gates of the MOS transistors MD of the partial decoding circuit DTo are all at a low potential, and therefore that the partial decoding circuit DTo has been selected by the combination of the address signals. The control line XO is charged, thus has a high potential, and when a low potential appears at the output of the delay line VZ, all MOS transistors MD of the partial decoding circuit DTo remain blocked so that the control line XO remains at a high potential as illustrated in the broken line form of the fifth line of FIG. 3. With all other partial decoding circuits DT1 through DTm, one or several MOS transistors MD are contained whose gates are at a high potential. If the trailing edge of the control pulse P, thus a low potential, appears at the output PV of the delay circuit VZ, the MOS transistors become conductive and the control lines X1 through Xm can discharge by way of the conductively controlled MOS transistors MD, as illustrated in the solid line portion of the fifth line of FIG. 3.

Due to the delayed trailing edge of the control pulse P at the output PV, the decoding circuit is prevented from becoming activated sooner than completion of the inversion of the address. If this condition were not to be maintained, the MOS transistors MD of the selected partial decoding circuit also could not be controlled or rendered conductive by the inverted address signals so that the control line would also be discharged.

Figure 2:
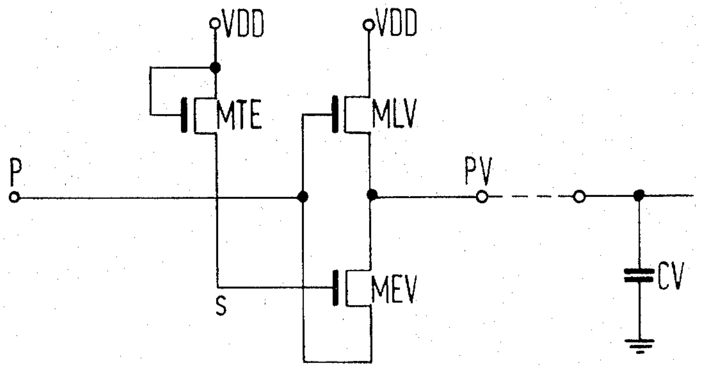
FIG. 2 is a schematic circuit representation of a delay circuit for use in the decoding circuit of FIG. 1.

An example of a delay circuit is illustrated in FIG. 2.

The delay circuit comprises a load or charging MOS transistor MLV, a discharge MOS transistor MEV and a control transistor MTE. The charge transistor MLV and the discharge transistor MEV are interconnected in the same manner as the address inverter IV of FIG. 1. A control pulse P is supplied in the same manner to these two MOS transistors. The control transistor MTE is connected at the gate of the discharge transistor MEV. The charged capacitances CV are charged at the beginning of the control pulse P by way of the charge transistor MLV and discharged by way of the discharge transistor MEV after the trailing edge of the control pulse P appears. The control transistor MTE supplies the level for controlling the discharge transistor MEV in order to delay the discharge of the capacitances CV. The delay of the control pulses with respect to the discharge of the address inverters is produced by the different levels at the gates of the discharge transistors of the delay circuit or the address inverters, respectively. The level of the address inverters in the 1 state is equal to the operational voltage VDD when the level of the control pulse P is greater than the operational voltage VDD plus the threshold voltage UT of the MOS transistor LM1. The level at the point *s* at the gate of the MOS transistor MEV, however, is equal to the operational voltage VDD minus the threshold voltage of the controlled transistor MTE. Therefore, the discharge transistor MEV becomes conductive later than the inverter transistor of the address inverters due to the trailing edge of the control pulse P. A further delay can be obtained by means of the design of the discharge transistor MEV which, for example, is designed in such a way that it discharges the capacitance CV somewhat slower than the inverter transistors of the address inverters discharge the capacitances of the address lines.

Although I have described my invention by reference to a particular illustrative embodiment thereof, many other changes and modifications may be made in the invention by one skilled in the art without departing from the spirit and scope of my invention and it is to be understood that I intend to include within the patent warranted hereon all such changes and modifications as may reasonably and properly be included within the scope of my contribution to the art.

I claim:

1. A decoder arrangement operating according to the dynamic principle for decoding addresses for an MOS transistor memory carried on a chip with the decoder arrangement, comprising: a plurality of partial decoder circuits each including a plurality of first MOS transistors, each of said transistors including a gate and a controlled conduction path having a first terminal connected to the like terminals of the other first transistors and forming a control line for a respective row of the memory and a second terminal connected to the like terminals of the other first transistors and exhibiting the distributed line capacitance with respect to a reference, and a second charging MOS transistor including a gate and a controlled conduction path having a first terminal connected to an operational potential and a second terminal connected to said first terminals of said plurality of first transistors, said gate of said second MOS transistor receiving clock pulses, a delay circuit including an input for receiving clock pulses and an output, said delay circuit operable to delay the trailing edge of a clock pulse, said output connected to said second terminals of said first transistors, said gates of said first transistors receiving respective binary address signals during a clock pulse, and a plurality of address signal inverters operable to invert the binary address signals after the trailing edge of a clock pulse and before the delayed trailing edge, whereby the combination of address and inverted address signals prevents the discharge of one of the distributed capacitances and effects discharge of the distributed capacitance of each other memory control line by way of the corresponding first transistors.

2. The decoder arrangement set forth in claim 1, wherein said delay circuit comprises a charging MOS transistor having a gate for receiving the clock pulses and a controlled conduction path connected at one end to the operational potential, a discharging MOS transistor having a gate and a controlled conduction path connected between the other end of the controlled conduction path of said charging MOS transistor and said gate of said charging MOS transistor, the junction of said controlled conduction paths forming said output of said delay circuit, and a control MOS transistor having a gate and a controlled conduction path connected at its one end to said gate and to the operational potential and at its other end to the gate of said discharging MOS transistor.

* * * * *